March 1, 1955

W. S. SAVILLE 2,703,109

DUCT CONSTRUCTION

Filed Aug. 25, 1951

INVENTOR:
William S. Saville
BY
Walter J. Jason
ATTORNEY

United States Patent Office 2,703,109
Patented Mar. 1, 1955

2,703,109

DUCT CONSTRUCTION

William S. Saville, San Diego, Calif., assignor, by mesne assignments, to General Dynamics Corporation, a corporation of Delaware Application August 25, 1951, Serial No. 243,676

8 Claims. (Cl. 138—55)

This invention relates to ducts and conduits adapted for use in conveying air and gases in heating, ventilating, anti-icing, and the like systems, and more particularly to ducts and conduits having improved non-metallic construction.

An object of the present invention is to provide a tubular element formed of non-metallic material and having a novel construction which will withstand abuse, absorb vibration forces, and will convey air and gases without leakage through the walls thereof.

Another object of the invention is the provision of an improved form of composite, non-metallic duct having rigid and flexible sections permitting relative movement between portions of the duct.

Another object of the invention resides in providing an impervious duct embodying a laminated construction of impregnated fibrous glass cloth built up to form an integral body.

A further object of the invention is to provide a duct formed of laminae of impregnated fibrous glass cloth, certain of which are impregnated with a resilient type of material and the others of which are impregnated with material affording rigidity to such laminae.

Other objects and features of the present invention will be readily apparent to those skilled in the art from the following specification and appended drawings wherein is illustrated a preferred form of the invention, and in which.

Figure 1:
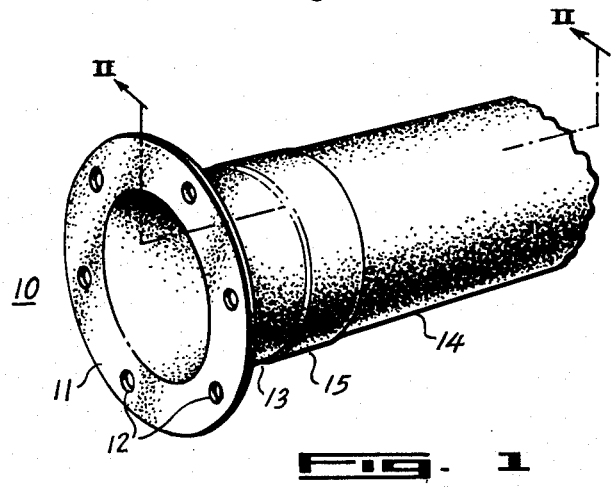
Figure 1 is a perspective view of a duct constructed in accordance with the present invention.

Having further reference now to the drawing, there is shown in Figure 1 a length of duct constructed in accordance with the present invention and indicated generally by the numeral 10. Duct 10, in the drawing, assumes a cylindrical form and includes an integral peripheral mounting flange 11, the latter suitably provided with annularly spaced peforations 12 for acceptance of conventional fastening means (not shown) for securing the duct 10 to a second length of duct, or to a wall support adjacent an outlet therein, or to any other conventional structure. The term "duct" used herein to identify the tubular element of Figure 1 is not to be understood as being limiting. The invention contemplates various gas conveying tubular elements such as conduit, pipes, and tubings, and further contemplates that these tubular elements may be of any convenient length, wall thickness and diameter. The form of the tubular element is not to be limited to the circular or cylindrical form shown as the invention is adapted for embodiment in tubular elements of any desired cross-sectional shape such as rectangular, square, oval, etc.

Duct 10 with its mounting flange 11 is formed of a plurality of laminations or layers bonded together, by any suitable and conventional method, into a self-supporting structure wherein the desired cross-sectional form is achieved and self maintained.

The mounting section of the duct 10 which includes peripheral flange 11 is constituted differently than is the body section thereof. The mounting section is indicated in the drawing generally by the numeral 13 and the body section is designated generally by the numeral 14. Mounting section 13 is required to have relatively greater rigidity and strength than is the body section 13 since it is by means of the mounting section 13 that attachment is made at the point of use. Flexibility, resiliency, high tear resistance and fairly high tensile strength are desired of the body section 14 to enable the duct 10, as a whole, to withstand shock, impacts, vibration forces and such other abuses to which the duct 10 may be subjected. Mounting section 13 and body section 14 merge at a joint 15 as will be described.

In attaining a construction for duct 10 having the desired characteristics, the laminae or layers comprising both the mounting section 13 and the body section 14 utilize as a core or base a fabric woven from fine glass fibers. This fabric is commercially known as glass cloth and is marketed as "Fiberglas" by the Owens-Corning Fiberglas Corp. This cloth is cut into the necessary lengths, impregnated with suitable materials (as will be hereinafter described in detail) to provide the desired rigidity and flexibility in the required sections thereof and then wrapped about a suitable mandrel and suitably processed under heat and pressure into the required shape.

The construction of mounting section 13 will be described first and in this connection attention is directed to Figures 2 and 3. Mounting section 13, as shown, comprises a plurality of laminations 16, 17 and 18. To achieve the desired rigidity and strength for the mounting section 13, laminations 16 and 17 are each formed of glass cloth, indicated at 19, which serves as a carrier for the impregnant required to provide rigidity to the laminations. The material employed as an impregnant may be any commercially available compound adapted when processed under proper heat and pressure conditions to convert to a hardened, tough and infusible state. Preferred impregnants are the synthetic thermosetting resins, such as phenol-aldehyde, urea aldehyde and thiourea aldehyde resins. The exact nature of these resins need not be described in detail since they are well-known in the art and are readily available in forms adapted for impregnating. The impregnant may be applied to the glass cloth in any suitable manner. Preferably the impregnant is applied in the form of a solution in a suitable volatile solvent, and disposed on the glass cloth in any suitable manner such as by spraying, brushing, screening, dipping, or other suitable means. The impregnated cloth is then air or artificially dried to drive off the solvent and permit handling. Under the action of heat and pressure, the impregnant becomes fluid and throroughly permeates the glass cloth and then converts to a hardened state.

Figure 4:
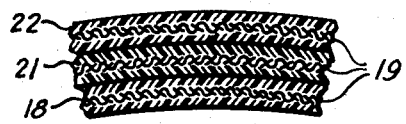
Figure 4 is a sectional view taken along the line IV—IV of Figure 2.

As stated hereinbefore, laminae 16 and 17 are intended to have the characteristics of rigidity and high strength in their final form. Lamina 18 which is included in the construction of the mounting section 13, and forms the interior wall surface of the duct 10, is differently constituted since it is utilized to prevent leakage of air or gases through the walls of the duct 10. It has been found that impregnants of the type employed in laminae 16 and 17 result in a structure having sufficient porosity as to leak very appreciable amounts of air or gases and thereby definitely detract from the efficiency of the duct as a vapor conducting member. Lamina 18 will therefore be composed of materials which, among other characteristics, render the lamina leakproof. The construction of lamina 18 will be similar to that of the laminae comprising the body section 14 and itself is incorporated in the construction of this flexible body section 14. As shown in Figures 2 and 4, body section 14 is composed of three laminae 21, 22 and lamina 18 of the mounting section 13. These three flexible laminae 21 and 22 and 18 all utilize glass cloth as a carrier or core, this glass cloth carrier is again identified in the drawings by the numeral 19. Flexibility, resiliency, and a leak-proof characteristic are afforded laminae 18, 21 and 22 through the impregnant employed. The material with which the glass cloth carriers are impregnated must be one which after being processed under suitable heat and pressure conditions will effect a structure that is impervious and has a yieldable quality, and further this impregnant must be compatible with the impregnants utilized in the formation of the laminae 16 and 17 of the mounting section 13. Such impregnants are readily commercially available; preferred forms thereof include uncured or unvulcanized rubber and synthetic rubbers as typified by neoprene (polymerized chloroprene).

Silicone rubber (a synthetic product produced from methyl silicone polymer milled with suitable fillers and curing agents) is another material which will afford the desired characteristics to the laminae comprising the flexible body section 14. However, this material is not adapted to use with the above named preferred impregnants utilized in the laminae 16 and 17 of the mounting section 13. An impregnant which may be substituted for the above named impregnants of the laminae of mounting section 13 is silicone resin. Silicones are commercially available in a variety of forms: liquids, rubber, resins, greases and compounds. The resins are adapted to be used for impregnating glass cloth. Glass cloth so impregnated will on the application of suitable heat and pressure produce a strong, rigid lamina suitable for use in constructing the mounting section 13 of the present duct. Therefore, if silicone resin is employed in the manufacture of the laminae 16 and 17 of the mounting section 13 silicone rubber may be used as the impregnant for the laminae of the flexible body section 14, since the impregnants are compatible.

A duct 10 which utilizes silicone impregnants, as described, is particularly desirable because of the well-known capacity of silicones to withstand elevated temperatures in use. A duct 10 constructed of these materials could be used in systems where the temperatures of the conveyed gases is of the order of 300° F. to 500° F. Ducts formed of the various other impregnants named are adapted for use where the temperature preferably does not exceed 300° F.

In effecting laminae 18, 21 and 22 the impregnant is applied in solution in a suitable solvent to the glass cloth and in a usual manner, as by dipping, spraying, screening, brushing or by means of a doctor blade or scrapper. It is then dried to drive off the solvent.

In constructing the duct 10 the various layers of impregnated glass cloth are assembled and shaped upon a suitable mandrel and then subjected to heat and pressure to form a unitary body utilizing heat and pressure means conventional in the manufacture of laminated articles, for example, vacuum bags, inflated envelopes, or close fitting male and female dies.

Figure 2:
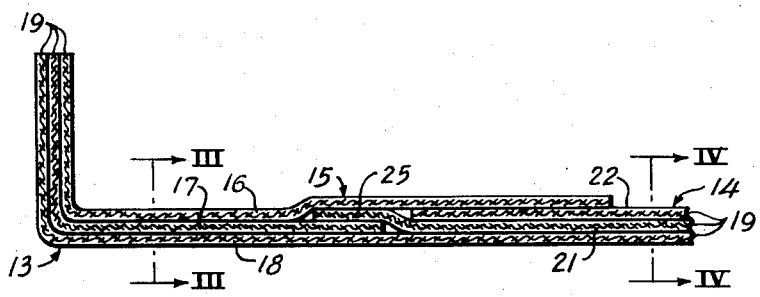
Figure 2 is a sectional view taken along the line II—II of Figure 1.
Figure 3:
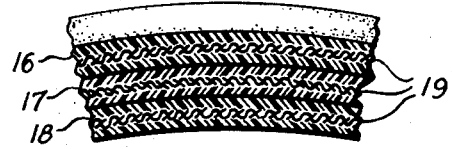
Figure 3 is a sectional view taken along the line III—III of Figure 2.

Figure 2 illustrates the relationship of the various impregnated layers of duct 10 one to the other. Flexible lamina 18 will be the innermost layer and will constitute the interior wall surface of the duct 10. Rigid lamina 17 lies disposed over lamina 18 and rigid lamina 16 is superposed on rigid lamina 17. At the body section 14 of the duct 10 flexible lamina 21 will overlie flexible lamina 18 and the second flexible lamina 22 is superposed on flexible lamina 21. It is noted that the joint 15 is effected by interleafing or overlapping the laminae of the rigid section 13 with those of the flexible body section 14. At the joint 15 the end 25 of the intermediate flexible lamina 21 extends upwardly and between the rigid laminae 16 and 17, and rigid lamina 16 is extended to overlie a portion of flexible lamina 22. On the application of heat and pressure to the described assembly, the contiguous portion of the laminae of the mounting section 13 and the flexible section 14 will unite and an intimate and secure union will be achieved at joint 15. Effecting a joint as described permits relative movement between the rigid section 13 and flexible section 14 without fracture or other injury to the duct.

The composition of a tubular element, in the contemplation of the present invention, is not to be limited to the specific number of layers or laminae as are embodied in duct 10 above described. The number of layers employed will depend upon the working pressures to which the duct will be subjected, the size of duct required for a specific task, and the rigidity desired for the duct. A sufficient number of laminae will be utilized as will effect a wall thickness which will serve the demands and conditions of a particular use.

According to the invention herein described, a tubular element is provided which has high strength and rigidity in the portions thereof requiring such characteristics, is flexible in the remaining portions thereof to permit the duct better to withstand shock and abuse, and is sealed throughout to prevent loss of gases through the walls thereof. The use of a strong, rigid mounting section insures that the duct will not abrade itself and rupture at the point of attachment to the support. Affording characteristics of pliancy and flexibility to the duct body will render it more resistant to being fractured should the duct body be subjected to a crushing force or to hard impacts. Permitting relative movement between the mounting section and the body section also adds to the capacity of the duct to endure shock. Additionally with the present construction, vibrations in the duct are held to a minimum.

It is to be understood that layer 18, the common layer, could be located intermediate the rigid layers 16 and 17 and the flexible layers 21 and 22 and yet provide the desired leak-proof characteristic to the rigid section 13. It is not necessary that layer 18 be limited to use as the interior wall surface; though from a manufacturing standpoint it is to be preferred.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A gas and air conveying duct comprising tubular sections including a body section comprised of integral wall portions formed of flexible laminae, and a mounting section having integral wall portions comprising rigid laminae; the adjacent ends of said flexible and rigid laminae being integrally joined, said mounting section having an integral rigid attachment portion provided at an end thereof.

2. A gas and air conveying duct comprising tubular sections including a body section comprised of integral wall portions formed of layers of woven glass fabric impregnated with a flexible material, and a mounting section having integral wall portions comprising rigid layers of woven glass fabric impregnated with a heat-pressure hardening synthetic resin, the adjacent ends of said wall portions of said sections being integrally joined, said mounting section having an integral rigid attachment portion at an end thereof formed of said rigid layers.

3. A gas and air conveying duct comprising a flexible body section and a rigid mounting section integrally joined at their adjacent ends, said sections having integral walls formed of laminations of fabric of fibrous material impregnated with binders which unite the laminations into an integral body, said mounting section having an integral rigid attachment flange formed at an end thereof.

4. A composite tubular element for transmission of gases and air comprising a flexible body section and a rigid mounting section integrally joined at their adjacent ends, said rigid section having walls formed of laminations of fibrous glass fabric impregnated with a binder which provides said walls of the rigid section with substantial structural rigidity, said flexible section having walls formed of laminations of fibrous glass fabric impregnated with a binder different from the first mentioned binder and compatible therewith, said rigid section having an outwardly projecting integral rigid mounting flange formed at an end thereof.

5. A gas and air conveying duct comprising tubular sections having laminated wall portions with one lamina being common to the wall portions of all said tubular sections to seal the duct against leakage, said lamina being formed of woven glass fabric impregnated with a flexible material, one of said tubular sections comprising laminae formed similarly to said common lamina, and the other of said tubular sections comprising laminae formed of woven glass fabric impregnated with a thermosetting synthetic resin compatible with said flexible impregnating material to provide a hard, rigid structure, the adjacent ends of the laminae of said tubular sections being integrally joined.

6. A composite tubular element for transmission of gases and air comprising a flexible section and a rigid section, each comprised of integral laminated walls, said walls having one lamina in common which forms an impervious barrier for said tubular element, said lamina being formed of woven glass fabric impregnated with a flexible material, said flexible section comprising laminae similar in composition to said common lamina, and said rigid section comprising laminae of woven glass fabric impregnated with a thermosetting synthetic resin compatible with said flexible impregnating material, the adjacent ends of the laminae of the flexible and rigid sections being integrally joined.

7. A composite tubular element for transmission of gases and air comprising integral laminated wall portions with an impervious, continuous lamina forming the interior wall surface of the tubular element, said lamina comprising fabric of woven fibrous glass impregnated with a flexible sealing material, a plurality of laminae similarly constituted to said interior wall surface lamina superimposed upon a portion of the length of said lamina, a plurality of laminae having substantial rigidity disposed upon said interior wall surface lamina along a second portion thereof, said last laminae comprising woven fibrous glass impregnated with a thermosetting synthetic resin compatible with said flexible sealing material, and a joint formed by overlapping of adjacent ends of said two sets of laminae.

8. A duct for transmission of gas and air having a mounting section with integral walls formed of a plurality of laminations including a lamination forming the inner wall surface of the duct and which is impervious to seal said duct against leakage, said laminations including laminae comprised of fabric of woven glass fibers impregnated with a heat-pressure sensitive thermosetting resin, and said inner wall surface lamina comprised of fabric of woven glass fibers impregnated with a flexible sealing substance.

References Cited in the file of this patent

UNITED STATES PATENTS

| | | |
|---|---|---|
| 2,472,485 | Krippendorf | June 7, 1949 |
| 2,475,389 | Hersey | July 5, 1949 |
| 2,525,070 | Greenwald et al. | Oct. 10, 1950 |
| 2,536,243 | Walker | Jan. 2, 1951 |
| 2,550,520 | Bennett | Apr. 26, 1951 |
| 2,561,449 | Ruderman | July 24, 1951 |